United States Patent
Wright

(10) Patent No.: US 10,173,651 B2
(45) Date of Patent: *Jan. 8, 2019

(54) COMPUTER CONTROLLED BRAKE RETAINER VALVE CONTROL SYSTEM

(71) Applicant: NEW YORK AIR BRAKE, LLC, Watertown, NY (US)

(72) Inventor: Eric C. Wright, Evans Mills, NY (US)

(73) Assignee: NEW YORK AIR BRAKE, LLC, Watertown, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/438,137

(22) Filed: Feb. 21, 2017

(65) Prior Publication Data

US 2018/0236987 A1    Aug. 23, 2018

(51) Int. Cl.
| | |
|---|---|
| *B60T 8/17* | (2006.01) |
| *B60T 7/12* | (2006.01) |
| *B60T 8/172* | (2006.01) |
| *B60T 11/34* | (2006.01) |
| *B60T 15/02* | (2006.01) |
| *B60T 13/66* | (2006.01) |
| *B60T 17/22* | (2006.01) |

(52) U.S. Cl.
CPC ............ *B60T 8/1705* (2013.01); *B60T 7/128* (2013.01); *B60T 8/172* (2013.01); *B60T 11/34* (2013.01); *B60T 13/662* (2013.01); *B60T 13/665* (2013.01); *B60T 15/021* (2013.01); *B60T 17/228* (2013.01)

(58) Field of Classification Search
CPC ........ B60T 8/1705; B60T 7/128; B60T 13/66; B60T 13/665; B60T 8/172; B60T 11/34; B60T 15/021
See application file for complete search history.

(56) References Cited

U.S. PATENT DOCUMENTS 6,854,570 B2    2/2005 Connell

FOREIGN PATENT DOCUMENTS

| WO | 1999/41119 | 8/1999 | |
|---|---|---|---|
| WO | WO-2015181764 A1 * | 12/2015 | ............ B60T 8/1893 |
| WO | 2016/018215 | 2/2016 | |

OTHER PUBLICATIONS

International Search Report Form PCT/ISA/220, International Application No. PCT/US2017/018688, pp. 1-11, dated Nov. 28, 2017.

* cited by examiner

*Primary Examiner* — Melanie Torres Williams
(74) *Attorney, Agent, or Firm* — Bond Schoeneck & King, PLLC; David Nocilly

(57) ABSTRACT

A computer controlled locomotive brake (CCB) configured for setting and releasing the retainer valves of the railcars of a train. The CCB may initially recharge the brake pipe to a pressure slightly less than the retainer valve release pressure. The CCB may then continue charging to this level until the brake pipe flow, measured at the CCB on the controlling locomotive and the brake pipe pressure on the last car, as measured by an end of train device, indicate that the pressure in the braking system reservoirs are substantively equal to the brake pipe pressure. Once the reservoirs are substantively charged, the CCB may complete the brake release and recharge by recharging the brake pipe pressure to its final charge so that all retainer valves are released and the train has sufficient braking system recharge to safely control movement of the train.

15 Claims, 2 Drawing Sheets

COMPUTER CONTROLLED BRAKE RETAINER VALVE CONTROL SYSTEM

BACKGROUND OF THE INVENTION

1. Field of the Invention

Figure 1:
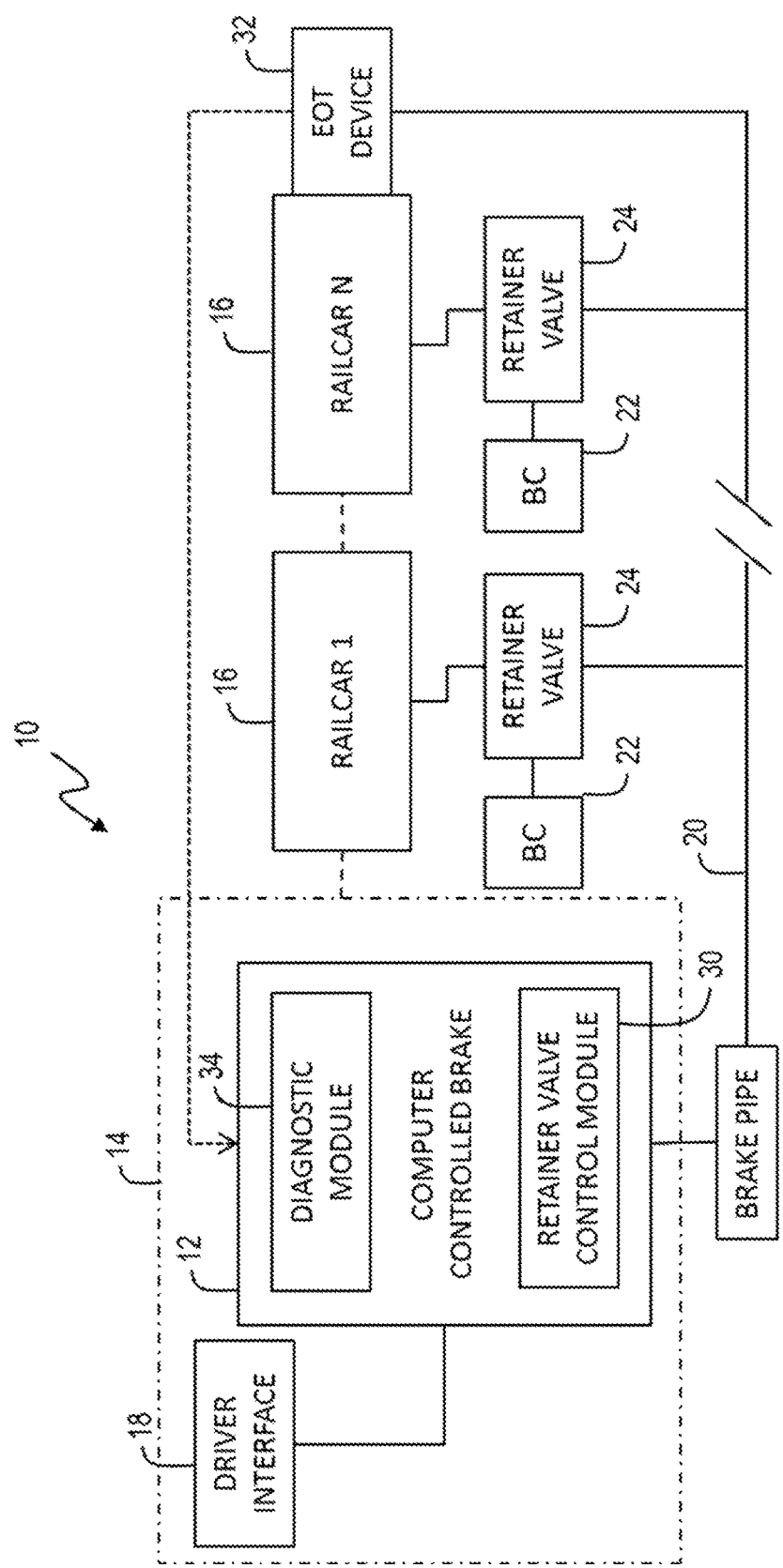

The present invention relates to train braking systems and, more specifically, to brake cylinder retainer valve control by a computer controller brake system.

2. Description of the Related Art

Conventional train parking systems are not effective in circumstances where the train needs to be parked at the top of a grade because the train braking system needs to be fully recharged before the train can proceed down the grade. As a result, the train must be first stopped using the automatic train brakes and then the train crew must manually set a proscribed number of hand brakes on the cars in the train. In some instances, the train crew may also set the retainer valves on each railcar in the train to the "high pressure" position to bottle approximately 20 psi in the brake cylinder. The train driver can then release and recharge the train braking system while the train remains stationary on the grade due to the manual hand brakes and, in some cases, the retainer valve application. A full recharge after a full service brake application may take more than five minutes. Once the train braking system is recharged to a safe level, the train crew must then manually release all of the hand brakes before the train can proceed down the grade with the automatic brakes used as needed to control the speed of the train speed. If the retainer valves were set to the "high pressure" position, the train must then be stopped and all the retainer valves manually reset to the release position to allow an unrestricted release of the brake cylinder by the railcar control valves. If a hand brake or a manual retainer valve is missed, the wheels on that railcar may be damaged due to skidding and/or overheating. As a result, there is a need for a system that can provide parking functionality via the brake cylinder retainer valves when a train is on a grade while reducing the amount of manual intervention that is required.

BRIEF SUMMARY OF THE INVENTION

The present invention is an automatic release valve control system having a computer controlled brake for controlling an amount of pressure in a brake pipe that is interconnected to a pilot of a release valve that will bottle brake cylinder pressure in a brake cylinder of a railcar when the brake pipe pressure at the pilot is below a bottle pressure and release brake cylinder pressure from the brake cylinder when the brake pipe pressure at the pilot is above a release pressure. The computer controlled brake is programmed to cause the brake pipe pressure in the brake pipe to charge to a first predetermined pressure that is below the release pressure of the retainer valve, to wait for a command indicating a full charge of the brake pipe, and to cause the brake pipe pressure in the brake pipe to charge to a second predetermined pressure in response to receipt of the command. The computer controlled brake may be programmed to determine whether the brake pipe has charged to the first predetermined pressure. The computer controlled brake may also be programmed to provide a notification to a driver of the train after determining that the brake pipe has charged to the first predetermined pressure. The computer controlled brake may additionally be programmed to slow the rate at which the brake pipe pressure in the brake pipe charges to the first predetermined pressure. The computer controlled brake may further be programmed to inhibit causing the brake pipe pressure in the brake pipe to charge to the first predetermined pressure before charging to the second predetermined pressure if the difference between the brake pipe pressure in the brake pipe at a first end of the train and the brake pipe pressure in the brake pipe at an opposing end of the train is above a predetermined threshold. The computer controlled brake may also programmed to reduce the brake pipe pressure to a level that is below the bottle pressure of the retainer valve but that is above zero.

The present invention also includes a system for controlling the retainer valves of railcar of a train that has at least one release valve that will bottle brake cylinder pressure in a brake cylinder of the railcar when the pressure at a pilot is below a bottle pressure and release the brake cylinder pressure from the brake cylinder when the pressure at the pilot is above a release pressure, a source of brake pipe pressure coupled to the pilot of the retainer valve, and a computer controlled brake controlling the brake pipe pressure, wherein the computer controlled brake is programmed to cause the pressure in the brake pipe to charge to a first predetermined pressure that is below the release pressure of the retainer valve, to wait for a command indicating a full charge of the brake pipe is desired, and to cause the pressure in the brake pipe to charge to a second predetermined pressure that is above the release pressure of the release valve in response to receipt of the command.

The present invention further includes a method of controlling a retainer valve. A first step of the method involves providing a retainer valve control module as part of a computer controlled brake that controls the brake pipe pressure of a train having at least one retainer valve that will bottle brake cylinder pressure in a brake cylinder of the railcar when pressure at a pilot of the retainer valve is below a bottle pressure and release brake cylinder pressure from the brake cylinder when pressure at the pilot is above a release pressure. Another step of the method involves causing the pressure in the brake pipe to charge to a first predetermined pressure that is below the release pressure of retainer valve. A further step of the method involves waiting for a command indicating a full charge of the brake pipe is desired after charging to the first predetermined pressure. An additional step of the method involves causing the pressure in the brake pipe to charge to a second predetermined pressure that is above the release pressure of the retainer valve in response to receipt of the command.

BRIEF DESCRIPTION OF THE SEVERAL VIEWS OF THE DRAWING(S)

Figure 2:
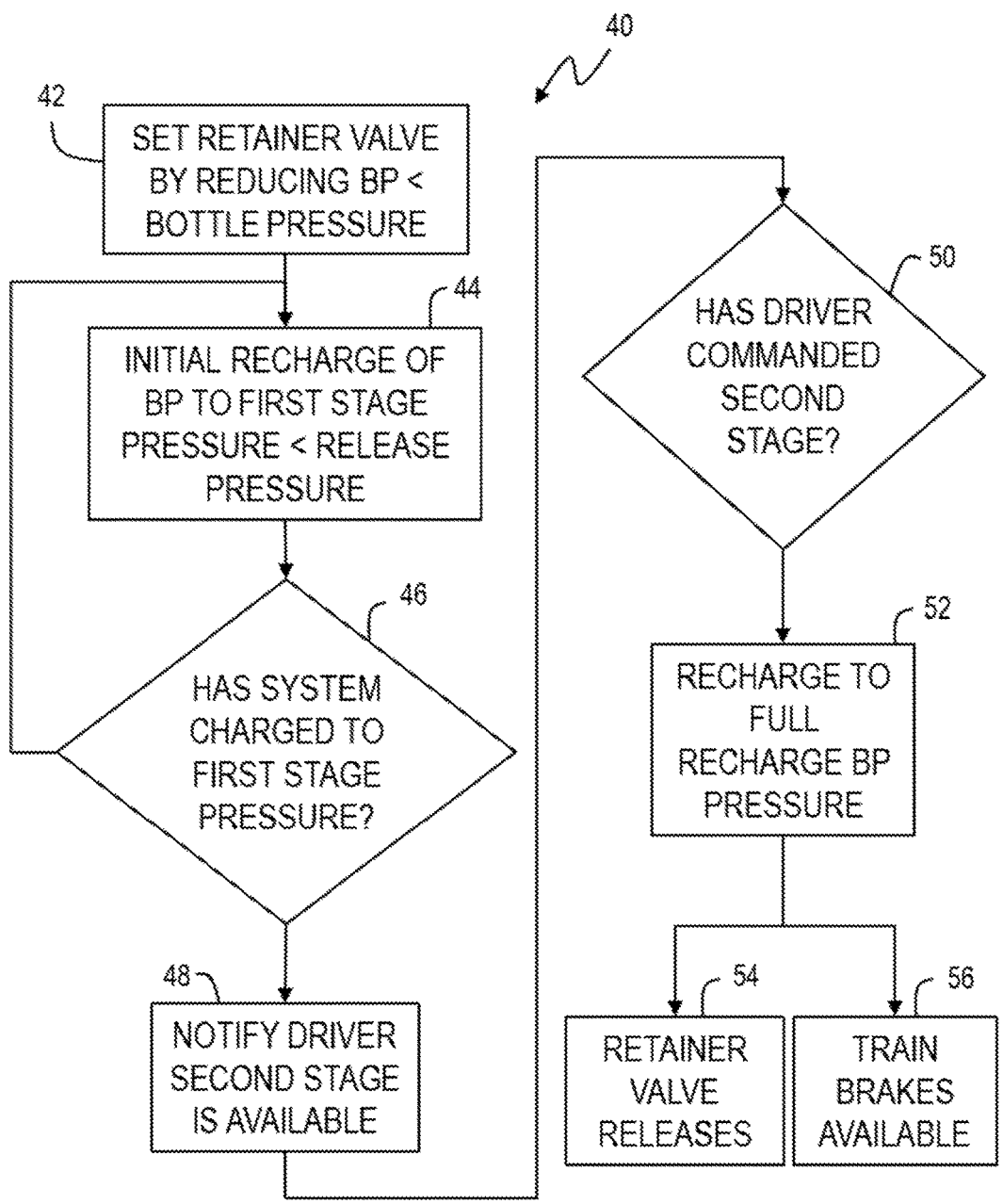

The present invention will be more fully understood and appreciated by reading the following Detailed Description in conjunction with the accompanying drawings, in which:

FIG. 1 is a schematic of a train braking system having computer controlled brake programmed to control retainer valves according to the present invention; and FIG. 2 is a flowchart of a two stage recharging process for a computer controlled brake programmed to control retainer valves according to the present invention.

DETAILED DESCRIPTION OF THE INVENTION

Referring to the figures, wherein like numerals refer to like parts throughout, there is seen in FIG. 1, an exemplary train 10 having a computer controlled brake (CCB) 12 associated with a lead locomotive 14 and one or more railcars 16. CCB 12 is interconnected to a driver interface 18 that can include a screen display as well as any mechanical or electronic inputs used by the driver to command changes in the braking system of train 10. More specifically, CCB 12 is programmed to respond to driver input and control the pressure of the brake pipe 20 that extends along the length of train 10. As is understood in the art, brake pipe 20 is used to provide pressurized air to railcars 16 and propagate the brake system signals that can cause the braking system of each railcar 16 to selectively apply and release the brake cylinders (BC) 22 of each railcar. The pressure in brake pipe 20 is also used to pilot a retainer valve 24 that is coupled to each brake cylinder 22 of railcar 16 to bottle the pressure in the brake cylinder 22 when the pressure in brake pipe 20 falls below a predetermined bottle pressure and thus provide a parking function. As is known in the art, a retainer valve 24 has an inlet connected to brake cylinder pressure and an outlet connected to an exhaust and are positioned downstream of and in series with the conventional brake cylinder control valve that controls the brake cylinder pressure. Retainer valve 24 is movable in response to pilot pressure between a release position, where brake cylinder pressure is vented to exhaust and a bottle position, wherein the brake cylinder pressure is isolated from exhaust.

To set the parking function of the train using retainer valve 24, the pressure in brake pipe 20 is generally reduced to less than a predetermined bottle pressure that is established by the design of retainer valve 24. When the bottle pressure threshold is satisfied, the retainer valve 24 bottles the pressure brake cylinder 22 to hold it in the brakes applied position. As seen in FIG. 1, CCB 12 includes a retainer valve control module 30 that ensures that retainer valve 24 remains in the bottle position during a recharge of the braking system of train 12 so that brake cylinders 22 are not released until the braking system of train 12 has recharged sufficiently that train 12 can be safely braked. It should be recognized by those of skill in the art that retainer valve control module 30 can be a discrete software implementation of CCB 12 or integrated into the programming of CCB 12. Additionally, retainer valve control module 30 can be provided as a discrete physical device that is incorporated or retrofit into CCB 12.

To provide a partial train brake recharge before brake release, retainer valve control module 30 initially recharges the brake pipe to a pressure slightly less than the predetermined retainer valve release pressure so that retainer valve 24 does not release the pressure in brake cylinder 22 during system recharging. The initial recharge continues until the brake pipe flow, measured by CCB 12 at the lead locomotive, and the brake pipe pressure on the last car, measured by EOT device 32, indicate that the pressure of the railcar braking system reservoirs (typically the auxiliary and emergency reservoirs) are substantively equal to the initial recharge brake pipe pressure target. Once the reservoirs are charged, retainer valve control module 30 can allow CCB 12 to complete a full release and recharge by recharging the brake pipe pressure to its normal full charge pressure. As the final charge pressure is greater than the retainer valve release pressure, all brakes will be released with the braking system at a sufficient level of recharge to enable safe operation of train 10.

The bottle pressure that triggers bottling of the brake cylinders by retainer valve 24 of the railcars is preferably selected to be less than the designed full service equalization pressure to prevent inadvertent bottling of the brakes during normal brake operation. For example, trains that are compliant with Association of American Railroads (AAR) requirements operate at a full release and recharge brake pipe pressure of 90 psi. A full service brake application is generally defined as a 26 psi reduction of the full release and recharge brake pipe reduction, i.e., 64 psi. Equalization, where the brake pipe, auxiliary reservoir, and brake cylinder pressures are equal, is actually about 60 psi. Any further reduction of brake pipe pressure below this equalization pressure will not result in additional brake force. Therefore, it is desirable to set bottle pressure at less than 60 psi, such as approximately 50 psi. At this bottle pressure, retainer valve 24 will bottle brake cylinder 22 following an emergency brake application where the brake pipe is vented to 0 psi. Retainer valve 24 will also bottle in response to any intentional reduction less than 50 psi. Retainer valve 24 will also bottle brake cylinder 22 in the event of any brake pipe leakage below 50 psi, which can occur if railcars 16 are parked following a full service brake application and brake pipe 20 is bottled up by the angle cock before the locomotive is disconnected from the train.

Some trains, such as those that are compliant with AAR regulations, include a feature referred to as "service accelerated release" that connects the emergency reservoir to the brake pipe during certain service brake releases. As an example, a service accelerated release from a full service brake application in 90 psi brake pipe pressure will rapidly charge the brake pipe to about 78 psi. For systems that include service accelerated release, the retainer valve release pressure is preferably selected to be less than the brake pipe release and recharge pressure, but greater than the service accelerated release pressure. For example, the release pressure may be set to 82 psi in a train operating with a 90 psi full release and recharge brake pipe pressure.

Referring to FIG. 2, retainer valve control module 30 of CCB 12 may be programmed with the appropriate logic and function to implement a retainer valve bottle/release process 40 as described above. To bottle brake cylinders 22, retainer valve control module 30 is configured to reduce the brake pipe pressure to a pressure less than the predetermined bottle pressure of the retainer valves 42. For example, if the retainer valve bottle pressure is set at 50 psi, retainer valve control module 30 can reduce the brake pipe pressure to 45 psi to ensure that all of the retainer valves are in the bottled position. Thus, retainer valve control module 30 can initiate a set retainer valve function that reduces the brake pipe pressure to just below the retainer valve bottle pressure to set the retainer valve in the bottle position without completely venting brake pipe to zero, thereby avoiding the need for the braking system to need to recharge from zero pressure when a recharge is desired.

To hold the train in the parked state while the braking system recharges, retainer valve control module 30 executes a two stage recharge that preserves brake cylinders 22 in the applied position while performing a partial recharge of the train braking system. The first stage begins with an initial recharge of the brake pipe to an initial recharge pressure that is slightly less than the predetermined release pressure of retainer valve 24 so that retainer valves 24 do not release the pressure from brake cylinders 22. For example, if the retainer valve release pressure is set at 82 psi, retainer valve control module 30 can recharge the brake pipe to 80 psi, which is slightly greater than the brake pipe pressure that results from any service accelerated release, but less than the retainer valve release pressure. As retainer valves 24 will not release brake cylinders 22 while the pressure in brake pipe 20 is being charged to below the release pressure, train 10 will not be free to roll if it is parked on a grade. At this brake pipe pressure, all of the braking system control valves on railcars 16 will be in the release and recharge position, and the braking system reservoirs on the cars will be recharging from brake pipe 20 via the railcar control valves.

Retainer valve control module 30 then performs a check 46 whether the train braking system has recharged to the initial first stage recharge pressure reaches equalization such that the pressures in brake pipe 20, the braking system reservoirs, and brake cylinder 22 are equal. For example, retainer valve control module 30 may check the air flow into brake pipe 20 though CCB 12 and the brake pipe pressure on the last car of the train via EOT device 32 to determine whether the train braking system has recharged throughout its length to the first stage recharge pressure. If not, recharging continues until check 46 confirms that the first stage recharge pressure has been reached. If so, retainer valve control module 30 notifies the train driver that it is safe that the second stage of recharging is available 48. For example, retainer valve control module 30 could display a message on driver interface 18 instructing the driver that it is safe to complete the release valve release. A check 50 is then performed to determine whether the driver has commanded the second stage. For example, the train driver can command the commencement of the second stage via an input associated with driver interface 18 or via the brake handle in the cab of locomotive 14. Once the second stage has been commanded, retainer valve control module 30 may then cause the train braking system to recharge to the full recharge brake pipe pressure 52. As the full recharge pressure is above the release pressure of retainer valve 24, retainer valve 24 will allow pressure to escape brake cylinder 22 so that it can return to the brakes releases position. As train 10 was provided with an initial recharge of the braking system via the first recharge stage, the braking system of train 10 has been sufficiently recharged so that the train brakes are available 56 and allow for safe control of train 10 along any grade that requires the use of the braking system. In the second stage, the brake pipe pressure is recharged to the full release and recharge pressure, e.g., 90 psi in the example above. Because the brake pipe and railcar braking system were already partially charged from the first stage, the brake pipe will pressurize quickly, resulting in uniform release of all of brake cylinders 22 on the train.

Notably, during normal train service brake operation, the brake pipe pressure is never reduced below equalization so retainer valve 24 will not bottle brake cylinder 22. If the brake pipe pressure has not been reduced below the retainer valve bottle pressure, CCB 12 will perform a single step release and recharge of the brake pipe pressure directly to the final value (e.g., 90 psi) whenever a brake release and recharge is required after a normal service brake operation.

Retainer valve bottle/release process 40 may be modified to address trains 10 that include or are required to implement service accelerated release. For example, in the first stage, retainer valve control module 30 could charge the brake pipe pressure to the initial first stage recharge pressure at rate that is slow enough to avoid the application of the service accelerated release function. While the initial stage recharge of the train braking system would thus take longer, retainer valve control module 30 could then charge the brake pipe in the second state at a rate that is sufficient to initiate service accelerated release, thereby accelerating the final recharging of the brake system as retainer valves 24 release brake cylinders 22.

CCB 12 may optionally include a diagnostic module 34 that determines the train brake pipe taper by comparing the brake pipe pressure at the head of the train and the brake pipe pressure at the end of the train via EOT device 32. Brake pipe leakage may be measured by the air flow into brake pipe 20 when brake pipe 20 is fully charged and/or when the brakes are set and brake pipe 20 is in a maintaining state. If the brake pipe taper is determined to be more than the full brake pipe release and recharge pressure minus the retainer valve release pressure, CCB 12 could be programmed to inhibit the two stage release of retainer valve control module 30. In a state of excessive brake pipe taper, the brake pipe pressure at the end of train 10 will not exceed the retainer valve release pressure and thus brake cylinders 22 at the end of train 12 will not be released by retainer valves 24. For example, brake pipe taper may be deemed excessive and used to inhibit process 40 if the brake pipe taper exceeds a difference of 8 psi (+/− an acceptable tolerance) from the full release pressure of 90 psi less the release pressure of 82 psi of retainer valves 24.

CCB 12 may be configured for use with a train management system, such as the LEADER® train control system available from New York Air Brake of Watertown, N.Y. For example, CCB 12 may be provided with the number and type of locomotives in the train and the track gradient where the train is currently stopped by the train control system. In addition, if the train manifest includes data indicating which cars in the train are equipped with retainer valves 24, the train control system can calculate the available train brake holding power. For example, the locomotive independent brake power and the total brake power available from railcars 12 equipped with retainer valves 24 may be compared to the amount of brake effort that is required to hold train 12 on the current grade (within an acceptable safety margin). If the train management system determines that there is not sufficient brake power to safely hold train 12, the train management system can provide a notification that a certain number of handbrakes must be set to provide the required amount of brake force or, if so equipped, apply a sufficient number of powered hand brakes.

Train 10 may also be outfitted with a release delay system that will, as the full release and recharge pressure is being reached by CCB 12, delay the release of retainer valves 24 on rail cars 16 positioned are at the front of the train so that they do not release brake cylinders 24 before railcars 16 positioned at the remote end of the train. For example, a release delay system may comprise a rate sensitive valve having an inlet connected directly to a first pilot and connected to a second pilot via a choke and a reservoir, where the rate sensitive valve is moveable between a first position, wherein said inlet is connected to an outlet via a second cracking valve having a second cracking pressure, and a second position, wherein the inlet is connected directly to the outlet. A second spring is positioned in parallel with said second pilot and provides a second force for biasing the valve into the first position. The release delay system may also comprise a rate sensitive valve having an inlet connected directly to a first pilot and connected to a second pilot via a choke and a reservoir, with the rate sensitive valve being moveable between a first position, wherein the inlet is connected to an outlet via the choke, and a second position, wherein said inlet is connected directly to the outlet. A second spring is positioned in parallel with the second pilot and provides a second force for biasing the rate sensitive valve into the first position.

The various system operating pressures described herein are for example and should not be considered limitations of the invention. Other pressures could be selected to provide the functionality of the present invention. As described above, the present invention may be a system, a method, or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. An automatic parking brake control system, comprising:
    a computer controlled brake for controlling an amount of pressure in a brake pipe that is interconnected to a pilot of an automatic parking brake that will latch a brake cylinder of a railcar when the pressure at the pilot is below a latch pressure and unlatch the brake cylinder when the pressure at the pilot is above an unlatch pressure;
    wherein the computer controlled brake is programmed to cause the pressure in the brake pipe to charge to a first predetermined pressure that is below the unlatch pressure of the automatic parking brake, to wait for a command indicating a full charge of the brake pipe, and to cause the pressure in the brake pipe to charge to a second predetermined pressure in response to receipt of the command.

2. The system of claim 1, wherein the computer controlled brake is programmed to determine whether the brake pipe has charged to the first predetermined pressure.

3. The system of claim 2, wherein the computer controlled brake is programmed to provide a notification to a driver of the train after determining that the brake pipe has charged to the first predetermined pressure.

4. The system of claim 3, wherein the computer controlled brake is programmed to slow the rate at which the pressure in the brake pipe charges to the first predetermined pressure.

5. The system of claim 4, wherein the computer controlled brake is programmed to inhibit causing the pressure in the brake pipe to charge to the first predetermined pressure before charging to the second predetermined pressure if the difference between the pressure in the brake pipe at a first end of the train and the pressure in the brake pipe at an opposing end of the train is above a predetermined threshold.

6. The system of claim 1, wherein the computer controlled brake is programmed to reduce the brake pipe pressure to a level that is below the latch pressure of the automatic parking brake but that is above zero.

7. A system for controlling the automatic parking brake of railcar of a train, comprising:
    at least one automatic parking brake that will latch a brake cylinder of the railcar when the pressure at the pilot is below a latch pressure and unlatch the brake cylinder when the pressure at the pilot is above a unlatch pressure;
    a source of brake pipe pressure coupled to the pilot of the automatic parking brake; and
    a computer controlled brake controlling the brake pipe pressure, wherein the computer controlled brake is programmed to cause the pressure in the brake pipe to charge to a first predetermined pressure that is below the unlatch pressure of the automatic parking brake, to wait for a command indicating a full charge of the brake pipe is desired, and to cause the pressure in the brake pipe to charge to a second predetermined pressure that is above the unlatch pressure of the automatic parking brake in response to receipt of the command.

8. The system of claim 7, further comprising an end of train device interconnected to the computer controlled brake for providing the brake pipe pressure at a remote end of the train.

9. The system of claim 8, wherein the computer controlled brake is programmed to determine whether the brake pipe has charged to the first predetermined pressure based at least in part on the brake pipe pressure at the end of train.

10. The system of claim 9, further comprising a driver display interconnected to the computer controlled brake, wherein the computer controlled brake is programmed to provide a notification to a driver of the train using the driver display when the brake pipe has charged to the first predetermined pressure or to notify the driver if the automatic parking brake is insufficient to hold the train.

11. The system of claim 10, wherein the computer controlled brake is programmed to slow the rate at which the pressure in the brake pipe charges to the first predetermined pressure.

12. The system of claim 11, wherein the computer controlled brake is programmed to determine whether the difference between the brake pipe pressure at the front of the train and the brake pipe pressure at the remote end of the train is above a predetermined threshold and, if so, inhibit causing the pressure in the brake pipe to charge to the first predetermined pressure before charging to the second predetermined pressure.

13. A method of controlling an automatic parking brake, comprising the steps of:
    providing a parking brake control module as part of a computer controlled brake that controls the brake pipe pressure of a train having at least one automatic parking brake that will latch a brake cylinder of the railcar when the pressure at the pilot is below a latch pressure and unlatch the brake cylinder when the pressure at the pilot is above a unlatch pressure;
    causing the pressure in the brake pipe to charge to a first predetermined pressure that is below the unlatch pressure of the automatic parking brake;
    waiting for a command indicating a full charge of the brake pipe is desired after charging to the first predetermined pressure; and
    causing the pressure in the brake pipe to charge to a second predetermined pressure that is above the unlatch pressure of the automatic parking brake in response to receipt of the command.

14. The method of claim 13, further comprising the step of checking whether the pressure in the brake pipe has charged to the first predetermined pressure and continuing to charge if the brake pipe has not charged to the first predetermined pressure.

15. The method of claim 14, further comprising the step of inhibiting the step of waiting for a command indicating a full charge of the brake pipe is desired after charging to the first predetermined pressure if the difference between the brake pipe pressure at the front of the train and the brake pipe pressure at the rear of the train exceeds a predetermined threshold.

* * * * *